United States Patent [19]
Schmidt

[11] Patent Number: 5,482,260
[45] Date of Patent: Jan. 9, 1996

[54] DAMPING ELEMENT

[76] Inventor: Alfred Schmidt, Rinestrasse 13,, D-35279 Neustadt, Germany

[21] Appl. No.: 241,195

[22] Filed: May 10, 1994

[30] Foreign Application Priority Data

May 10, 1993 [DE] Germany .................... 9307059 U

[51] Int. Cl.⁶ ........................................................ F16F 7/00
[52] U.S. Cl. ............................ 267/141; 267/153; 267/293
[58] Field of Search .................................. 267/141, 153, 267/140.3, 136, 292, 293, 136

[56] References Cited

U.S. PATENT DOCUMENTS

| | | | |
|---|---|---|---|
| 3,095,187 | 6/1963 | Sweeney et al. | 267/141 X |
| 3,399,851 | 9/1968 | Racca | 267/140.3 |
| 3,553,749 | 1/1971 | Majeske | 267/153 |
| 4,139,187 | 2/1979 | Hanusa | 267/153 X |
| 4,509,730 | 4/1985 | Shtarkman | 267/141 X |
| 4,629,154 | 12/1986 | Kataczynski | 267/153 X |
| 4,913,410 | 4/1990 | Marshall | 267/153 |
| 5,054,753 | 10/1991 | Polus | 267/141 X |

FOREIGN PATENT DOCUMENTS

| 521370 | 6/1992 | European Pat. Off. . |
|---|---|---|
| 2433024 | 1/1976 | Germany . |
| 3514211 | 10/1986 | Germany . |

*Primary Examiner*—Mark T. Le
*Assistant Examiner*—Peter M. Poon
*Attorney, Agent, or Firm*—Lowe, Price, LeBlanc & Becker

[57] ABSTRACT

A damping element (10) comprises disintegrated closed-cell foamed material such as loose shreds or incoherent granules (14) of polyurethane foam under predetermined stress within an envelope (12) of an elastically yielding material of given fluid permeability and made from a format (16) of fiber material such as jute, fleece or elastic fabrics of given density, perforated plastics foil, etc. When compression-filled with the granulated material (14), it is permanently closed by sewing up, sealing or conglutinating adjacent edges or seams (18) to form e.g. a cylindrical or bale-type body or a tubular body with a through-hole (20). The envelope (12) may be encircled by a force-receiving container having a shell (26) mounted to rims (25) of a cover (22) and a bottom (24). Preferred use is in supporting structures such as machine beds, engine bearers, three-dimensional bearings, shock absorbers, telescopic cylinders, air cushions, etc. with or without oil impregnation. It is also suitable for emergency supports or makeshift bearings.

27 Claims, 1 Drawing Sheet

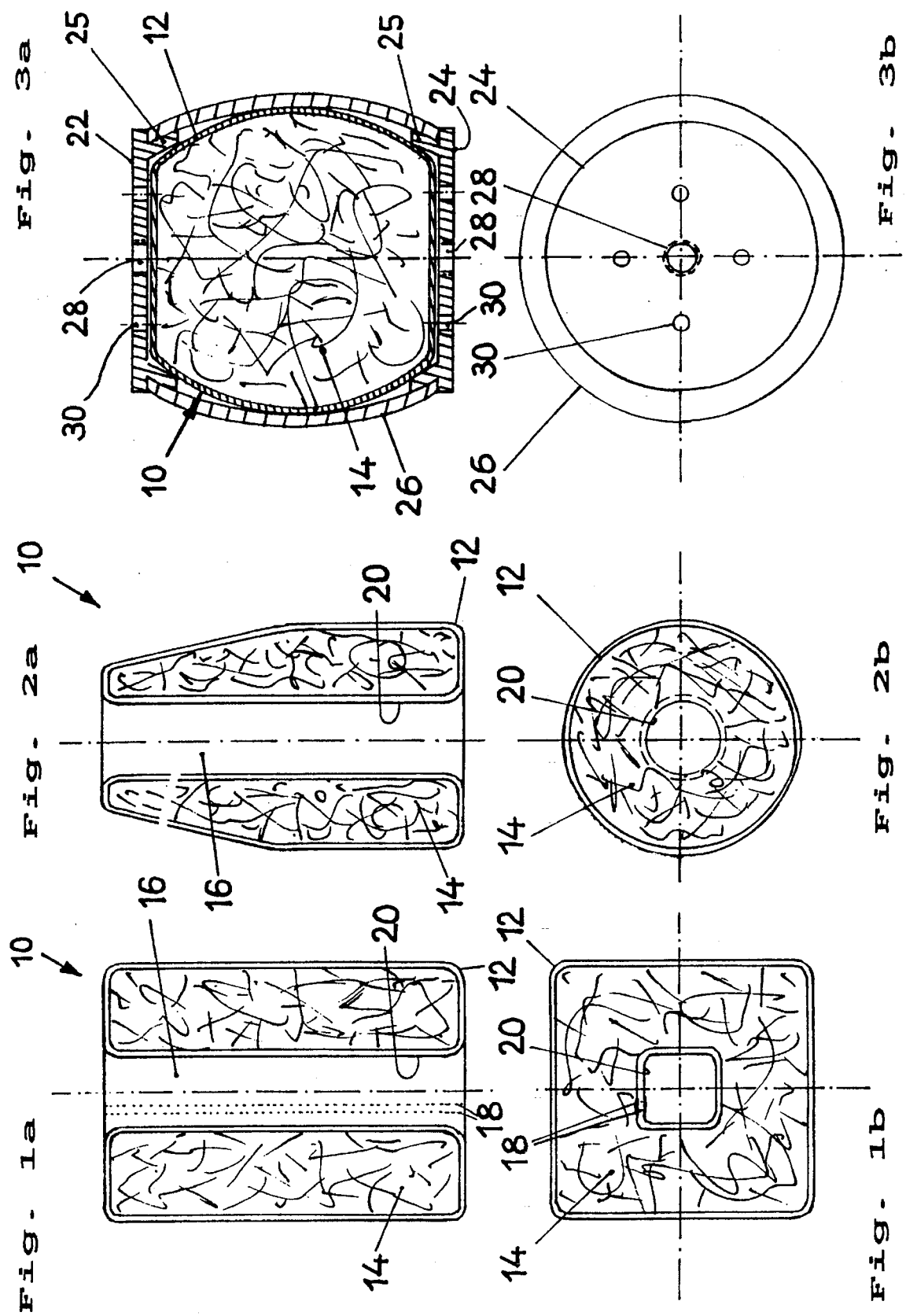

DAMPING ELEMENT

The invention relates to a damping element (10) comprising loose shreds or incoherent granules (14) of closed-cell polyurethane foam material retained under predetermined stress within a container (12), wherein the container (12) is an envelope made of elastically yielding material of given fluid permeability and deformably encloses the granulate filling. In accordance with the invention, the damping element is adapted for use in supporting structures designed to receive operational load such as machine beds, engine bearers, three-dimensional bearings, shock absorbers, telescopic cylinders or the like, especially for emergency supports or auxiliary bearings.

Shock absorption, vibration dampening and silencing are important in many technical fields, e.g. for elastically supporting machines, for isolating engines and pumps, in apparatus engineering, terotechnology, etc. Numerous damping means have been proposed, among them telescopic cylinders, rubber-metal buffers and connections, compound bodies of elastic material with metal elements, gate-type mufflers, etc. For example, DE 24 33 024 A1 discloses a device having two rigid plates between which loose elastic cushions are distributed at random. These may—similar to a spring element according to DE 75 15 117 U1—consist of shreds or granules of used vulcanized rubber. However, solid-borne sound connections that will inadvertently pass vibrations are brought about by settling of the damping material, by age-hardening and/or by edge support or other contacts of the fixing means.

A shock absorber as disclosed by EP 0 521 370 A1 is provided with shreds or granules of cellular polyurethane housed in a pot-type container for dampened air cushioning. Cylindrical mounting means are necessary; unless fixed throughout, a cover plate must be held by securing bolts at some points, viz. at a plurality of peripheral locations.

It is an important object of the invention to improve damping elements of the last-mentioned type in such a way that they are easily adaptable to existing local conditions and shapes for variegated use. Most simple means are to be employed, and it is a special aim to economically work up remnants of other manufactures. It is yet another objective of the invention to be able to provide predetermined spring-damping characteristics as required.

The features of a damping element according to the invention are stated in the appended claims.

Based upon a vibration absorber as disclosed in EP 0 521 370 A1, the invention provides for housing closed-cell foam shreds such as loose polyurethane (PU) remnants or incoherent granules of like material in an elastically yielding envelope of predetermined or adjustable fluid permeability so as to retain the granulate filling in bodies that may have virtually any shape desired, holding the PU shreds within. Owing to its permeance, the envelope will prevent any build-up of heat even under severe vibration load, in contrast to conventional damping elements that frequently become hot and remain so already under normal operating conditions. The novel components can be provided with suitable spring-damping characteristics at the outset in order to meet any given practical requirements in advance, and they can easily be manufactured at low cost using recycled material; as they are adapted to be received in casings or seats of almost any type and shape, no transportation problems arise. This, in turn, will permit numerous applications even in such industrial areas which were previously barring dampeners because metal-reinforced or metal-fixtured elements had to be used.

Important advantages of the invention are due to the fact that no fixing means are provided or required at the envelope whereby, without detriment to the damping .properties, the operating life is remarkably extended, e.g. compared to conventional compound bodies described in DE 35 14 211 A1. The bodies disclosed there include a rectangular core of polyurethane foam having an outer skin with fixing elements but comprising only a small portion of closed cells so that its Shore hardness is in the lower region between 15 and 55. Consequently, such pseudo-elastic bodies will absorb only moderate kinetic energy, e.g. of lesser shocks and impacts.

In accordance with another aspect of the invention, the envelope includes a fiber material, especially of gas-permeable material such as jute, fleece or elastic fabrics a predetermined density, perforated plastics foils, etc. By selecting the envelope material it is possible to control the desired extent of fluid or air exchange with the ambience. This will not only affect the spring characteristic but also the dissipation of heat generated by vibrations, rapidly succeeding impacts or similar operational load. While higher operating temperatures tend to considerably reduce the damping properties as well as the service life, continuous disspiation of heat will keep the temperatures much lower and thus greatly increase the material endurance.

Advantageously, the envelope comprises a format of predetermined geometry which is permanently closed after a compressed charge of granules has been filled in. However, the closed format forms an envelope of substantially cylindrical, bale-type or tubular shape. The invention further provides that the granules are compressed from all sides as they are introduced into the envelope which, having been closed, retains them under predetermined stress. It will be realized that such damping elements have an extremely simple structure and that, therefore, they can be produced most economically. At the same time, a high degree of deformability is achieved which is very important for many uses.

The endurance of the damping elements is further enhanced by sewing up or sealing, adjacent edges or seams of the format, in particular by hot-sealing or conglutinating. Very high reliability is obtained if the size of the format and the filling weight of the charge of granules are tuned to the load capacity of the envelope, especially in such manner that its maximum tension will not exceed 60 percent of its resistance to tearing. However, other proportioning for stress and strain is likewise possible, depending upon the application intended.

Additional security is achieved by the design of the invention according to which the envelope is encircled by an outer force-receiving container, preferably comprising a shell mounted onto rims of a cover or a bottom. Some or all of the container portions may include vents to permit air exchange. At least the shell may have damping properties itself; it may be made of elastically yielding plastics.

According to another feature of the invention, a preferred field of use of the disclosed structure is in supporting structures designed to receive operational load such as machine beds, engine bearers, three-dimensional bearings, shock absorbers, telescopic cylinders or the like. Use of such damping elements for air cushions and/or with oil impregnation of single units or of a plurality of them, or even for emergency supports or makeshift bearings, will be most expedient in an exigency.

Further features, particulars and advantages of the invention will become apparent from the wording of the claims and from the following elucidation of special embodiments shown in the drawings wherein FIG. 1a is a longitudinal sectional view of an embodiment of a damping element, FIG. 1b is a cross sectional view of the damping element shown in FIG. 1a, FIG. 2a is a longitudinal sectional view of another embodiment of a damping element, FIG. 2b is a cross sectional view of the damping element shown in FIG. 2a, FIG. 3a is a longitudinal sectional view of a further embodiment of a damping element within a fixture and FIG. 3b is a top view of the fixture shown in FIG. 3a.

As evident from FIGS. 1a and 1b, a damping element generally designated by 10 comprises an envelope 12 made up of a format 16 having edges or seams 18 which are permanently closed after a charge of granules 14 has been introduced under compression from all sides. Sealing is effected by sewing up or hot-sealing or conglutinating the edges 18. The embodiment shown in FIGS. 1a and 1b has a hollow cuboid body with a through-hole 20 of square cross section.

By contrast, the embodiment of FIGS. 2a and 2b comprises a round through-hole 20 and an outer shape which is part-cylindrical and part-conical. Again, the format 16 is closed after the introduction of compressed granules 14 by sealing the edges or seams (not shown here).

In the example of FIGS. 3a and 3b, a bale-type damping element is enclosed by a fixture or outer force-receiving container having a cover 22, a bottom 24 and a shell 26 encompassing both with tight engagement of a rim 25 or single lugs extending inwardly from cover 22 and from bottom 24. In each of the latter, a tapped hole 28 may be provided for attachment to adjacent bodies (not shown) such as machine beds, engine bearers, shock absorbers, etc. Vents 30 in cover 22, in bottom 24 and/or in shell 26 serve for air exchange to ambience. Such vents 30 are also contemplated in numbers and arrangements other than illustrated. At least shell 26 may be made of elastically yielding plastics with damping properties in order to minimize sound conduction.

The charge of granules 14 to be introduced into an envelope 12 preferably comprises a closed-cell polyurethane foam material, consisting in particular of NDI which is short for 1,5-naphthylenediisocyanate. The damping elements 10 can be used with or without oil impregnation. They can be manufactured in any shapes and sizes required and are well suited to be employed with or without housings, as the case may be.

The invention is not limited to the particular embodiments described above since numerous variations are possible without leaving its basic principle. However, it will be realized that fundamentally, the disclosed damping element 10 comprises disintegrated closed-cell foamed material such as recycled loose shreds or incoherent granules 14 of polyurethane foam compressed under predetermined stress within an envelope 12 made of an elastically yielding material of given fluid permeance. The envelope 12 is obtained from a format 16 of fiber material such as jute, fleece or elastic fabrics of given density, perforated plastics foil, etc. When compression-filled with the granulate material 14, it is permanently closed by sewing up, sealing or conglutinating adjacent edges or seams 18 to form e.g. a cylindrical or bale-type body or a tubular body with a through-hole 20. Preferred use is in supporting structures, e.g. machine beds, engine bearers, three-dimensional bearings, shock absorbers, telescopic cylinders, air cushions or the like, with or without oil impregnation. The novel damping elements are also suitable for emergency supports or makeshift bearings.

All and any features and advantages of the invention, inclusive of design details, of spatial arrangements and of procedural steps, as evident from the claims, from the specification and from the drawings may be inventively substantial both per se and in most variegated combinations.

I claim:

1. Damping element (10) comprising granulate filling, including loose shreds or incoherent granules (14) of closed-cell polyurethane foam material retained under predetermined stress within a container (12), wherein said container (12) is an envelope made of elastically yielding material of given fluid permeability and deformably encloses the granulate filling, wherein the envelope (12) comprises fiber material selected from the group of gas-permeable material consisting of jute, fleece or elastic fabrics of predetermined density, and perforated plastics foils.

2. Damping element according to claim 1, wherein the envelope (12) comprises a format (16) of predetermined geometry which is permanently closed after a compressed charge of granules (14) has been filled in.

3. Damping element according to claim 2, wherein the closed format (16) forms envelope (12) in a substantially cylindrical, bale-type or tubular shape.

4. Damping element according to claim 2, wherein adjacent edges or seams (18) of the format (16) are sewed up or sealed.

5. Damping element according to claim 2, wherein the size of the format (16) and a filling weight of the charge of granules (14) are tuned to the load capacity of the envelope (12), especially in such manner that its maximum tension will not exceed 60 percent of its resistance to tearing.

6. Damping element according to claim 2, wherein the size of the format (16) and a filling weight of the charge of granules (14) are tuned to the load capacity of the envelope (12).

7. Damping element according to claim 2, wherein adjacent edges or seams (18) of the format (16) are sewed up or sealed by hot sealing.

8. Damping element according to claim 2, wherein adjacent edges or seams (18) of the format (16) are sewed up or sealed by conglutinating.

9. A damping element according to claim 1, in supporting structures designed to receive operational load selected from a group consisting of machine beds, engine bearers, three-dimensional bearings, shock absorbers, and telescopic cylinders.

10. A damping element according to claim 1, in combination with emergency supports.

11. A damping element according to claim 1, wherein said element is air filled.

12. Damping element according to claim 1, wherein the envelope (12) comprises a permanently closed format (16) of predetermined geometry including a filled in and compressed charge of granules (14).

13. Damping element (10) comprising a granulate filling, including loose shreds or incoherent granules (14) of closed-cell polyurethane foam material retained under predetermined stress within a container (12), wherein said container (12) is an envelope made of elastically yielding material of given fluid permeability and deformably encloses the granulate filling, wherein the envelope (12) comprises a format (16) of predetermined geometry which is permanently closed after a compressed charge of granules (14) has been filled in, wherein the granules (14) are compressed from all sides as they are introduced into the envelope (12) which, having been closed, retains them under predetermined compression.

14. Damping element (10) comprising a granulate filling, including loose shreds or incoherent granules (14) of closed-cell polyurethane foam material retained under predetermined stress within a container (12), wherein said container (12) is an envelope made of elastically yielding material of given fluid permeability and deformably encloses the granulate filling, wherein the envelope (12) is encircled by an outer force-receiving container, preferably comprising a shell (26) mounted onto rims (25) of a cover (22) and a bottom (24).

15. A damping element (10) comprising a granulate filling, including loose shreds or incoherent granules (14) of closed-cell polyurethane foam material retained under predetermined stress within a container (12), wherein said container (12) is an envelope made of elastically yielding material of given fluid permeability and deformably encloses the granulate filling, wherein said element is oil impregnated.

16. Damping element (10) comprising disintegrated closed-cell foamed material contained under stress within an envelope (12) of an elastically yielding material of given fluid permeability and made from a format (16) of fiber material selected from the group consisting of jute, fleece, elastic fibers of given density and perforated plastics foil, wherein said foamed material is selected from the group consisting of loose shreds and incoherent granules (14) of polyurethane foam.

17. Damping element according to claim 16, said envelope including said disintegrated closed-cell foamed material compression-filled therein, wherein said envelope (12) comprises a cylindrical body.

18. Damping element according to claim 17, wherein said cylindrical body comprises a tubular structure having a throughhole therein.

19. Damping element according to claim 18, wherein said tubular structure comprises sealed adjacent seams (18) permanently closing said tubular structure.

20. Damping element according to claim 18, wherein said tubular structure comprises sewed up adjacent seams (18) permanently closing said tubular structure.

21. Damping element according to claim 18, wherein said tubular structure comprises conglutinated adjacent seams (18) permanently closing said tubular structure.

22. Damping element according to claim 18, further comprising an outer force-receiving container encircling said envelope body, said container including a shell (26), a cover portion (22) and a bottom portion (24), said cover portion having rims (25), said shell mounted to said rims (25) and to said bottom portion (24).

23. Damping element according to claim 17, wherein said cylindrical body comprises a bale structure.

24. Damping element according to claim 23, wherein said bale structure comprises adjacent permanent sealing edges.

25. Damping element according to claim 17, wherein said cylindrical body comprises vents.

26. Damping element according to claim 16, further comprising an outer force-receiving container encircling said envelope body, said container including a shell (26), a cover portion (22) and a bottom portion (24), said cover portion having rims (25), said shell mounted to said rims (25) and to said bottom portion (24).

27. Damping element according to claim 16, said envelope including said disintegrated closed-cell foamed material compression-filled therein, wherein said envelope (12) comprises a cuboid structure.

\* \* \* \* \*